US012572573B2

(12) United States Patent
Sedouram et al.

(10) Patent No.: US 12,572,573 B2
(45) Date of Patent: Mar. 10, 2026

(54) SESSION-BASED USER AWARENESS IN LARGE LANGUAGE MODELS

(71) Applicant: GOOGLE LLC, Mountain View, CA (US)

(72) Inventors: Ramprasad Sedouram, Bangalore (IN); Dharma Teja, Warsaw (PL)

(73) Assignee: GOOGLE LLC, Mountain View, CA (US)

( * ) Notice: Subject to any disclaimer, the term of this patent is extended or adjusted under 35 U.S.C. 154(b) by 117 days.

(21) Appl. No.: 18/374,575

(22) Filed: Sep. 28, 2023

(65) Prior Publication Data

US 2025/0110974 A1 Apr. 3, 2025

(51) Int. Cl.
| | |
|---|---|
| *G06F 40/242* | (2020.01) |
| *G06F 3/01* | (2006.01) |
| *G06F 3/04842* | (2022.01) |
| *G06F 16/3329* | (2025.01) |

(52) U.S. Cl.
CPC .......... *G06F 16/3329* (2019.01); *G06F 3/013* (2013.01); *G06F 3/04842* (2013.01); *G06F 40/242* (2020.01)

(58) Field of Classification Search
CPC ..... G06F 16/3329; G06F 40/242; G06F 3/013
See application file for complete search history.

(56) References Cited

U.S. PATENT DOCUMENTS

| | | | |
|---|---|---|---|
| 7,100,123 B1 | 8/2006 | Todd et al. | |
| 11,769,017 B1 * | 9/2023 | Gray ....................... | G06F 40/56 |
| | | | 704/9 |
| 2003/0160830 A1 | 8/2003 | DeGross | |
| 2014/0379428 A1 * | 12/2014 | Phansalkar ........... | H04L 67/535 |
| | | | 705/7.32 |
| 2019/0222540 A1 | 7/2019 | Relangi | |

OTHER PUBLICATIONS

European Patent Office; International Search Report and Written Opinion issued in Application No. PCT/US2024/048956; 12 pages; dated Dec. 6, 2024.

* cited by examiner

*Primary Examiner* — Ibrahim Siddo
(74) *Attorney, Agent, or Firm* — Gray Ice Higdon

(57) ABSTRACT

Implementations are described herein for using the information about user engagement with large language model (LLM) output as a subsequent input into an LLM, so that the LLM is able to provide, for rendition on one or more output devices, a subsequent output that is tailored to the user. In various implementations, based on one or more input device signals, a user engagement event with an element of a first LLM output generated using a LLM and rendered using one or more output devices may be detected. Additional information about the element of the first LLM output may be captured and used to generate at least part of a subsequent input prompt for the LLM. The subsequent input prompt may be processed using the LLM to generate a subsequent LLM output for rendition on one or more of the output devices.

20 Claims, 8 Drawing Sheets

400

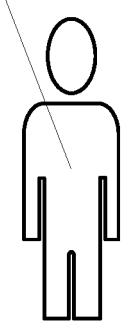

TELL ME ABOUT MERGE SORT

MERGE SORT IS A SORTING ALGORITHM THAT IS BASED ON THE DIVIDE AND CONQUER STRATEGY. IT IS ONE OF THE MOST EFFICIENT SORTING ALGORITHMS, WITH BOTH BEST AND WORST CASE COMPLEXITIES BEING O(nLOGn)

IS IT FASTER THAN BUBBLE SORT?

110

YES, MERGE SORT IS GENERALLY FASTER THAN BUBBLE SORT. BUBBLE SORT HAS A WORST-CASE TIME COMPLEXITY OF O(N^2). THIS MEANS THAT MERGE SORT WILL TAKE AT MOST N LOG N COMPARISONS TO SORT A LIST OF N ELEMENTS, WHILE BUBBLE SORT WILL TAKE AT MOST N^2 COMPARISONS.

FIG. 4

TELL ME ABOUT MERGE SORT

500

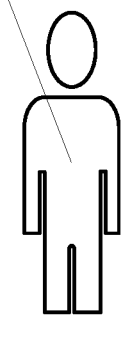

MERGE SORT IS A SORTING ALGORITHM THAT IS BASED ON THE DIVIDE AND CONQUER STRATEGY. IT IS ONE OF THE MOST EFFICIENT SORTING ALGORITHMS, WITH BOTH BEST AND WORST CASE COMPLEXITIES BEING O(nLOGn)

*LOOKS UP EXPLANATION OF "O(nLOGn) COMPLEXITY" OUT-OF-BAND

110

IS IT FASTER THAN BUBBLE SORT?

YES, MERGE SORT IS GENERALLY FASTER THAN BUBBLE SORT. BUBBLE SORT HAS A WORST-CASE TIME COMPLEXITY OF O(N^2).

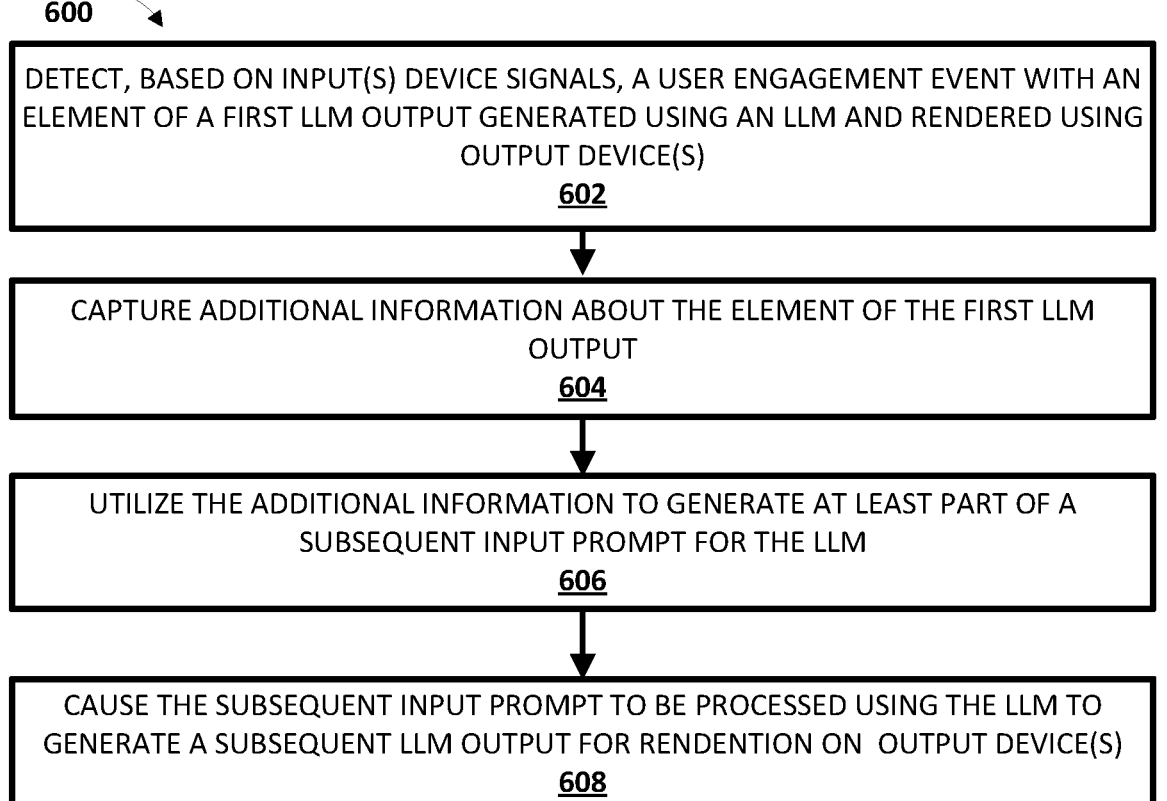

DETECT, BASED ON INPUT(S) DEVICE SIGNALS, A USER ENGAGEMENT EVENT WITH AN ELEMENT OF A FIRST LLM OUTPUT GENERATED USING AN LLM AND RENDERED USING OUTPUT DEVICE(S)
602

CAPTURE ADDITIONAL INFORMATION ABOUT THE ELEMENT OF THE FIRST LLM OUTPUT
604

UTILIZE THE ADDITIONAL INFORMATION TO GENERATE AT LEAST PART OF A SUBSEQUENT INPUT PROMPT FOR THE LLM
606

CAUSE THE SUBSEQUENT INPUT PROMPT TO BE PROCESSED USING THE LLM TO GENERATE A SUBSEQUENT LLM OUTPUT FOR RENDENTION ON OUTPUT DEVICE(S)
608

FIG. 6

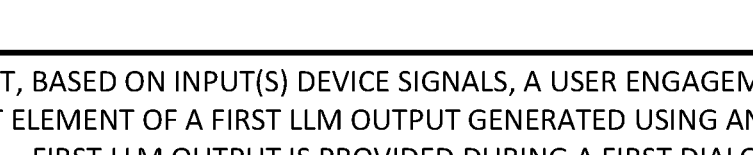

700

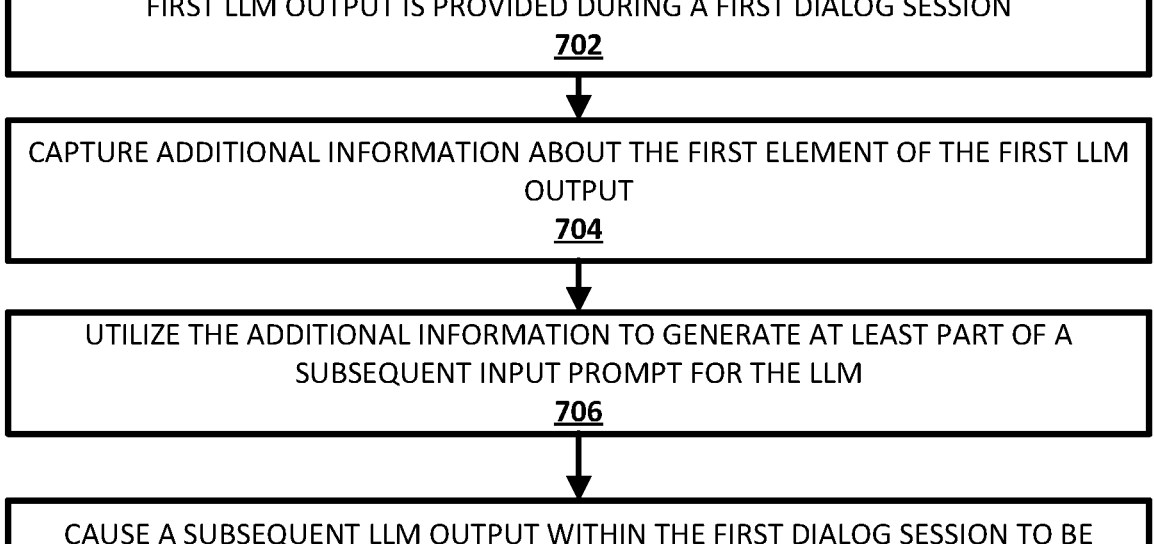

DETECT, BASED ON INPUT(S) DEVICE SIGNALS, A USER ENGAGEMENT EVENT WITH A FIRST ELEMENT OF A FIRST LLM OUTPUT GENERATED USING AN LLM, WHERE THE FIRST LLM OUTPUT IS PROVIDED DURING A FIRST DIALOG SESSION
702

CAPTURE ADDITIONAL INFORMATION ABOUT THE FIRST ELEMENT OF THE FIRST LLM OUTPUT
704

UTILIZE THE ADDITIONAL INFORMATION TO GENERATE AT LEAST PART OF A SUBSEQUENT INPUT PROMPT FOR THE LLM
706

CAUSE A SUBSEQUENT LLM OUTPUT WITHIN THE FIRST DIALOG SESSION TO BE RENDERED ON OUTPUT DEVICE(S)
708

FIG. 7

SESSION-BASED USER AWARENESS IN LARGE LANGUAGE MODELS

BACKGROUND

Large language models (LLMs) are particular types of machine learning models—sometimes referred to as "generative models"—that can perform various natural language processing (NLP) tasks, such as language generation, machine translation, and question-answering. These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based input that is received from a client device, and generate a NL based output that is responsive to the NL based input and that is to be rendered at the client device.

One challenge of these LLMs is that they may not be able to provide a suitable response to a user's question. LLMs do not know the level of a user's knowledge or expertise; accordingly, the LLM may provide an answer that is too complex for a user's knowledge level. For example, when a user receives an answer from an LLM with one or more words that they are unable to understand, they may have to look the word up in a dictionary, utilize an in-built thesaurus or synonym finder, or ask another human. These are all time consuming and may lead the user to not continue utilizing the LLM for their need. Alternatively, where a user has an advanced knowledge level, the LLM's response to the user's question may be too general or basic for the user.

SUMMARY

When a user views a response from an LLM they may not, depending on their level of expertise, understand certain portions of the output. However, in these instances where a user may not understand certain portions of the output, they may engage with one or more elements the output, for example by hovering their mouse cursor proximate certain words or phrases for which they would like additional information to be presented in a pop-up graphical element.

For example, the system may be able to track a user's engagement with an element of the LLM response, which may trigger an event capturing additional information about the element of the LLM output, for example the location or coordinates of the portion of the LLM output. The system may additionally be able to determine the length of time in which the user has engaged with (e.g., hovered over) the LLM output. This data may be used in a variety of ways to assist a user in processing the information contained in the output of the LLM.

Implementations are described herein for using this type of information regarding engagement of a user with an LLM output (i.e., engagement data and/or additional information retrieved about the engaged with element(s) of the LLM output) to condition an LLM and provide an improved user experience. More particularly, but not exclusively, techniques are described herein for using the information about user engagement with LLM output as a subsequent input into an LLM, so that the LLM is able to provide, for rendition on one or more output devices, a subsequent output that is tailored to the user.

In various implementations, a first LLM output provided in response to a user request may be textual. A user engagement event may be one or more user mouse movements that are proximate to a portion of the textual output. In additional or alternative implementations, the user engagement event may be a gaze or focus by a user's eyes on a portion of the LLM output. Additional information about the element of the first LLM output engaged with by the user, which may in some implementations include information such as the definition or meaning of the element(s) engaged with by the user, can be retrieved and utilized to generate at least part of a subsequent input prompt for the LLM. The subsequent input prompt can be processed using the LLM, alone or in conjunction with a subsequent user query, to generate a subsequent LLM output for rendition on one or more of the output devices.

In some implementations, the first LLM output and subsequent LLM output can be a part of the same dialog session; while in additional or alternative implementations, the first LLM output and the subsequent LLM output are in different dialog sessions.

In some implementations, a user engagement event can be used to modify a first LLM output, such as "rewriting" the current response (either automatically or after prompting the user). For example, if a certain threshold of user engagement events occurs or if a user engages with the output for a predetermined length of time, then a user may be prompted asking if they would like a definition of a word or phrase and/or if they would like a simplified version of the output. If an affirmative user input is received, the LLM may be prompted to make the previous output or certain portions thereof easier to understand. In some implementations, the entire previous output of the LLM may be rewritten, while in some additional or alternative implementations, it may only be certain portions (e.g., a particular paragraph or sentence) that are rewritten.

A user engagement event can additionally or alternatively, in some implementations, be used to influence future LLM responses. For example, if a user moused over "Term 1" to obtain a popup definition, that definition can be included into the next input prompt processed using the LLM. In other words, the engagement event (e.g., mouse over) can form a portion of the conversational context. If a user engages with the term "fiduciary" in a LLM output in response to Question 1 in order to obtain a definition of the term "fiduciary" and the user then asks a subsequent question (Question 2), the input to the LLM can include token(s) indicating that the user needed a definition for the term "fiduciary" (e.g., the input may be "Respond to Question 2 in view of [Conversation History, including "user needed a definition of 'fiduciary' in last response]").

In some implementations, additional information about the element of the first LLM may include information regarding the speed (e.g., fast vs. slow) and/or extent (e.g., single movement vs. multiple movements; single word vs. multiple words) of user engagement event (e.g., mouse over or glance) with the LLM output. For example, a "slow" and "single" mouse over event directed to one or more words of an LLM output may result in a subsequent output of a popup containing a definition and/or additional context for the word(s). Additionally or alternatively, "fast" and/or "multiple" mouse over events directed to an entire paragraph of an LLM output may result in a subsequent LLM output including a simplified version of the paragraph that makes it easier to understand.

In some implementations, the subsequent LLM output may contain additional context, for mouse over events. For example, this subsequent output may be a summary. The summary may be provided at a later time and/or through another device. The summary may, for example, include definitions for moused over term(s) at conclusion of a dialog.

In various implementations, a method implemented using one or more processors includes: detecting, based on one or more input device signals, a user engagement event with an element of a first large language model (LLM) output generated using a LLM and rendered using one or more output devices; capturing additional information about the element of the first LLM output; utilizing the additional information to generate at least part of a subsequent input prompt for the LLM; and causing the subsequent input prompt to be processed using the LLM to generate a subsequent LLM output for rendition on one or more of the output devices.

In some implementations, the first LLM output is textual and the user engagement event is a user mouse movement proximate one or more words of the textual output of the LLM. In some such implementations, the user engagement event can further include a speed of a user mouse movement. In some such implementations, the user engagement event can further include an extent of the user mouse movement. In additional or alternative implementations, the first LLM output is textual and the user engagement event is a user glance proximate one or more words of the textual output of the LLM.

In some implementations, the additional information is rendered on one or more of the output devices in response to the detecting. In some additional or alternative implementations, the additional information about the element of the first LLM output is a definition of one or more words of the first LLM output.

In some implementations, the first LLM output is provided during a first dialog session and the subsequent LLM output is provided during a second dialog session.

In some implementations, the subsequent LLM output is a prompt for a user to answer. In some additional or alternative implementations, the additional information is presented at one or more of the output devices in a pop-up window or as additional LLM output. In some implementations, the additional information comprises a digital image portraying the element of the first LLM output.

In another aspect, a method implemented using one or more processors includes: detecting, based on one or more input device signals, a user engagement event with a first element of a first large language model (LLM) output generating using an LLM; where the first LLM output is provided during a first dialog session; capturing additional information about the element of the first LLM output; utilizing the additional information to generate at least part of a subsequent input prompt for the LLM; and causing a subsequent LLM output within the first dialog session to be rendered on one or more output devices.

In still another aspect, a system comprising one or more processors and memory storing instructions that, in response to execution, cause the one or more processors to: detect, based on one or more input device signals, a user engagement event with an element of first large language model (LLM) output generated using a LLM; capture additional information about the element of the first LLM output; utilize the additional information to generate at least part of a subsequent input prompt for the LLM; and cause the subsequent input prompt to be processed using the LLM to generate a subsequent LLM output for rendition on one or more of the output devices.

In some implementations, the first LLM output is textual and the user engagement event is a user mouse movement proximate one or more words of the textual output of the LLM. In some implementations, the additional information is rendered on one or more of the output devices in response to detection of the user engagement event. In some implementations, the additional information comprises a digital image portraying the element of the first LLM output.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 schematically depicts an example scenario in which an LLM is used.

FIG. 5 schematically depicts an example scenario in which selected aspects of the present disclosure may be implemented.

FIG. 6 depicts a flowchart illustrating an example method of practicing selected aspects of the present disclosure, in accordance with various implementations.

FIG. 7 depicts a flowchart illustrating another example method of practicing selected aspects of the present disclosure, in accordance with various implementations.

DETAILED DESCRIPTION OF THE DRAWINGS

When a user views a response from an LLM they may not, depending on their level of expertise, understand certain portions of the output. In these instances where a user may not understand certain portions of the output, they tend to engage with one or more elements the output, for example by hovering their mouse cursor proximate certain words or phrases for which they would like additional information to be presented, e.g., in a pop-up graphical element or as an additional LLM output. This additional information can be captured and used as additional input into the LLM, e.g., alone or in combination with subsequent NL input(s), in order to provide the user with a subsequent LLM output or response.

Figure 1:
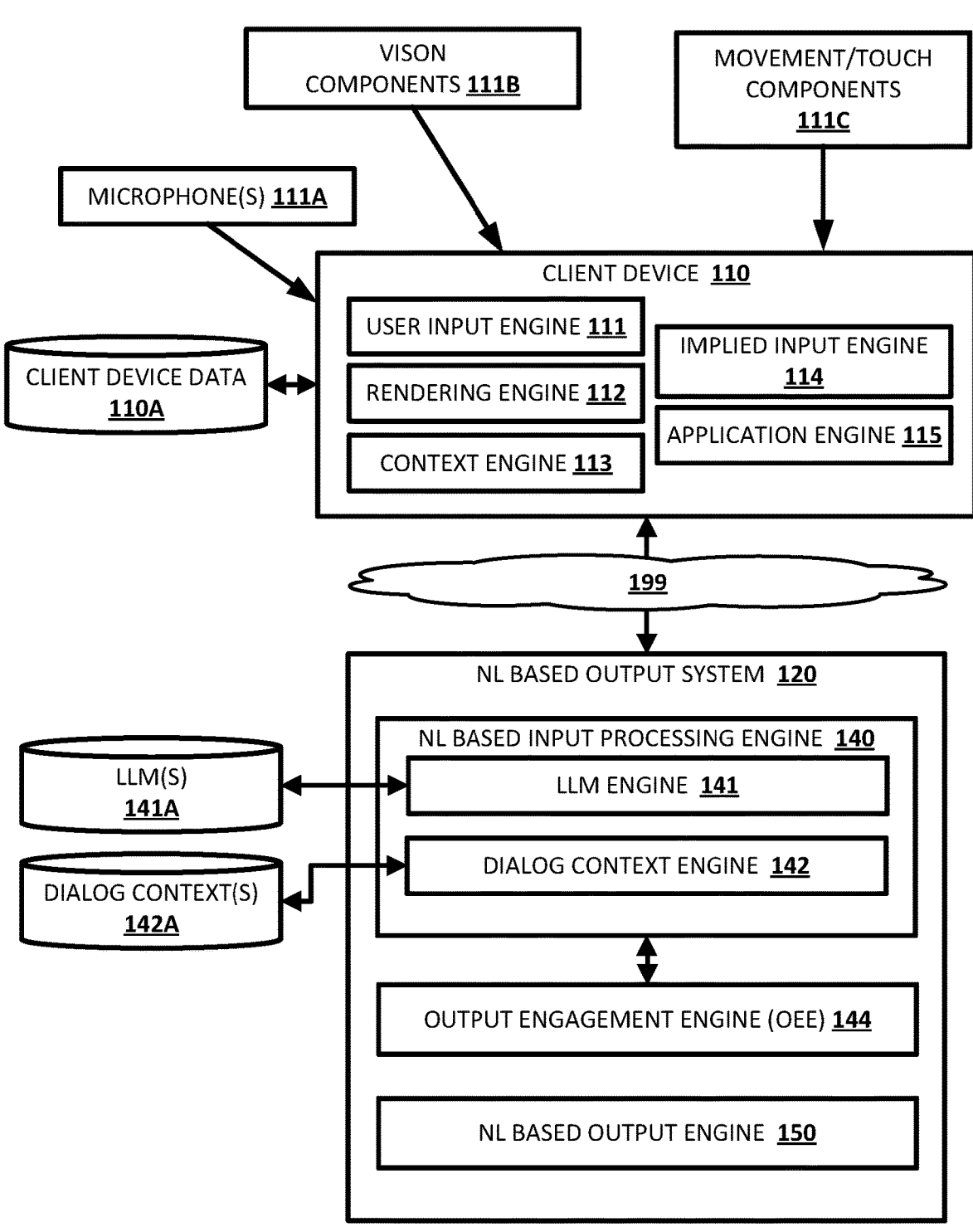
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a natural language (NL) based output system 120, which is depicted separately in FIG. 1. In some implementations, all or aspects of the NL based output system 120 can be implemented locally at the client device 110. In additional or alternative implementations, all or aspects of the NL based output system 120 can be implemented remotely from the client device 110 as depicted in FIG. 1 (e.g., at remote server(s)). In those implementations, the client device 110 and the NL based output system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which NL based input can be submitted and/or NL based output and/or other output that is responsive to the NL based input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser or automated assistant installed on top of the operating system of the client device 110. As another example, the application engine 115 can execute a web browser software application or automated assistant software application that is integrated as part of the operating system of the client device 110. The application engine 115 (and the one or more software applications executed by the application engine 115) can interact with the NL based output system 120.

In various implementations, the client device 110 can include a user input engine 111 that is configured to detect user input provided by a user of the client device 110 using one or more user interface input devices. The client device 110 can, optionally, be equipped with one or more microphones 111A that capture audio data, such as audio data corresponding to spoken utterances of the user. Additionally, or alternatively, the client device 110 can be equipped with one or more vision components 111B that are configured to capture vision data corresponding to digital images and/or movements (e.g., gestures) detected in a field of view of one or more of the vision components. Additionally, or alternatively, the client device 110 can be equipped with one or more movement or touch sensitive components 111C (e.g., a keyboard and mouse, a stylus, a touch screen, a touch panel, one or more hardware buttons, etc.) that are configured to capture signal(s) corresponding to movement touch input directed to the client device 110.

Some instances of a NL based input described herein can be a query for a NL response that is formulated based on user input provided by a user of the client device 110 and detected via user input engine 111. For example, the query can be a typed query that is typed via a physical or virtual keyboard (e.g., 111C), a suggested query that is selected via a touch screen or a mouse of the client device 110, a spoken voice query that is detected via microphone(s) of the client device 110 (and optionally directed to an automated assistant executing at least in part at the client device 110), an image or video query that is based on vision data captured by vision component(s) of the client device 110 (or based on NL input generated based on processing the image using, for example, object detection model(s), captioning model(s), etc.), or any combination thereof. Other instances of a NL based input described herein can be a prompt for NL content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image prompt that is based on an image captured by a vision component of the client device 110.

In various implementations, the client device 110 can include a rendering engine 112 that is configured to render content (e.g., NL based output, an indication of source(s) associated with the NL based output, and/or other content) for audible and/or visual presentation to a user of the client device 110 using one or more user interface output devices. For example, the client device 110 can be equipped with one or more speakers that enable the content to be provided for audible presentation to the user via the client device 110. Additionally, or alternatively, the client device 110 can be equipped with a display or projector that enables the content to be provided for visual presentation to the user via the client device 110. In some implementations, rendering engine 112 or another component of client device 110 or NL based output system may be configured to, in addition to providing audio or visual output, control one or more "smart" (e.g., network connected) devices and/or appliances, such as smart lights, smart televisions, smart heating ventilation and air conditioning (HVAC) equipment, smart kitchen appliances, and so forth.

In various implementations, the client device 110 can include a context engine 113 that is configured to determine a context (e.g., current or recent context) of the client device 110 and/or of a user of the client device 110 (e.g., an active user of the client device 110 when the client device 110 is associated with multiple users). In some of those implementations, context engine 113 can determine a context based on data stored in client device data database 110A. The data stored in the client device data database 110A can include, for example, user interaction data that characterizes current or recent interaction(s) of the client device 110 and/or a user of the client device 110, location data that characterizes a current or recent location(s) of the client device 110 and/or a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113 via the client device data database 110A or otherwise.

For example, the context engine 113 can determine a current context based on a current state of a dialog session (e.g., considering one or more recent inputs provided by a user during the dialog session), profile data, and/or a current location of the client device 110. For instance, the context engine 113 can determine a current context of "visitor looking for upcoming events in Louisville, Kentucky" based on a recently issued query, profile data, and an anticipated future location of the client device 110 (e.g., based on recently booked hotel accommodations). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., an NL based output) for an implied NL based input.

In various implementations, the client device 110 can include an implied input engine 114 that is configured to generate an implied NL based input, independent of any user explicit NL based input provided by a user of the client device 110. The implied input engine 114 may also be configured to submit an implied NL based input, optionally independent of any user explicit NL based input that requests submission of the implied NL based input; and/or cause rendering of search result(s) or a NL based output for the implied NL based input, optionally independent of any explicit NL based input that requests rendering of the search result(s) or the NL based output. For example, the implied input engine 114 can use one or more past or current contexts, obtained from the context engine 113, in generating an implied NL based input, determining where to submit the implied NL based input (e.g., to an LLM engine 141 or an output engagement engine 144), and/or in determining to cause rendering of search result(s) or a NL based output that is responsive to the implied NL based input.

In some implementations, the implied input engine 114 can automatically generate and automatically submit an implied query or implied prompt based on the one or more past or current contexts. Further, the implied input engine 114 can automatically push the search result(s) or the NL based output that is generated responsive to the implied query or implied prompt to cause them to be automatically rendered or can automatically push a notification of the search result(s) or the NL based output, such as a selectable notification that, when selected, causes rendering of the search result(s) or the NL based output. Additionally, or alternatively, the implied input engine 114 can submit respective implied NL based input at regular or non-regular intervals, and cause respective search result(s) or respective NL based outputs to be automatically provided (or a notification thereof automatically provided). For instance, the implied NL based input can be "patent news" based on the one or more past or current contexts indicating a user's general interest in patents, the implied NL based input or a variation thereof periodically submitted, and the respective search result(s) or the respective NL based outputs can be automatically provided (or a notification thereof automatically provided). It is noted that the respective search result(s) or the respective NL based output can vary over time in view of, e.g., presence of new/fresh search result document(s) over time.

Further, the client device 110 and/or the NL based output system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The NL based output system 120 is illustrated in FIG. 1 as including a NL based input processing engine 140, an output engagement engine 144, and a NL based output engine 150. Some of these engines can be combined and/or omitted in various implementations. Further, these engines can include various sub-engines. For instance, the NL based input processing engine 140 is illustrated in FIG. 1 as including a LLM engine 141 and a dialog context engine 142. Similarly, some of these sub-engines can be combined and/or omitted in various implementations. Accordingly, it should be understood that the various engines and sub-engines of the NL based output system 120 illustrated in FIG. 1 are depicted for the sake of describing certain functionalities and are not meant to be limiting.

Further, the NL based output system 120 is illustrated in FIG. 1 as interfacing with various databases, such as LLM(s) database 141A, dialog context(s) database 142A. Although particular engines and/or sub-engines are depicted as having access to particular databases, it should be understood that is for the sake of example and is not meant to be limiting. For instance, in some implementations, each of the various engines and/or sub-engines of the NL based output system 120 may have access to each of the various databases. Further, some of these databases can be combined and/or omitted in various implementations. Accordingly, it should be understood that the various databases interfacing with the NL based output system 120 illustrated in FIG. 1 are depicted for the sake of describing certain data that is accessible to the NL based output system 120 and is not meant to be limiting.

In various implementations, NL based output system 120 can cause the LLM engine 141 to process, using an LLM stored in the LLM(s) database 141A, NL based input to generate a stream of LLM output that may be provided by NL based output engine 150. The LLM can include, for example, any LLM that is stored in the LLM(s) database 141A, such as PaLM, BARD, BERT, LaMDA, Meena, GPT, and/or any other LLM, such as any other LLM that is encoder-only based, decoder-only based, sequence-to-sequence based and that optionally includes an attention mechanism or other memory. The stream of LLM output provided to NL based output engine 150 can include, for example, a probability distribution over a sequence of tokens, such as words, phrases, or other semantic units, which are predicted to be responsive to the NL based input. Notably, the LLM can include billions of weights and/or parameters that are learned through training the LLM on enormous amounts of diverse data. This enables the LLM to generate the LLM output as the probability distribution over the sequence of tokens. In various implementations, NL based output system 120 may cause dialog context engine 142 to manage dialog contexts based on data stored in dialog context database 142A, including identifying new dialog contexts, shifting between existing dialog contexts, etc.

Output engagement engine 144 may be configured to capture information about how users engage with element(s) of LLM output (sometimes referred to as "user engagement events" herein) and/or additional information about the element(s) of LLM output that were engaged with by the user (sometimes referred to herein as "additional information retrieved based on user engagement events"). While depicted as part of NL based output system 120 in FIG. 1, all or parts of output engagement engine 144 and/or functionality attributed herein to output engagement engine 144 may be implemented on client device 110 or elsewhere. For instance, user engagement with element(s) of LLM output, such as hovering a mouse cursor over or looking at particular words or phrases, may be detected at client device 110, e.g., by a portion of output engagement engine 144 or by a component such as user input engine 111 or context engine 113. This engagement may trigger retrieval, e.g., by client device and/or NL based output system 120, of additional information about the engaged—with element(s), such as a definition or explanation of a word or concept, an image depicting a word or concept, etc.

The user engagement events captured by output engagement engine 144 can include information regarding user mouse movements (or other movement or touch based components, such as a stylus, etc.) proximate one or more words of a textual output. The user engagement events can also include information regarding the speed and/or extent of a user's mouse movement, and/or information about a user's glance proximate one or more words of the textual output.

The additional information about the engaged with element(s) can include, for instance, a definition of one or more words utilized in the LLM output, an explanation of concept(s) expressed in the LLM output, an image depicting word(s) or concept(s) in the LLM output, etc. In various implementations, the additional information about the engaged with element(s) can be presented on the output device(s) in a pop-up window or as additional LLM output, can be a digital image portraying the element of the LLM output, and/or can be rendered on one or more of the output devices.

In various examples described herein, the user engagement events(s) and/or the additional information retrieved about the engaged with element(s) of the LLM output may be used to generate a subsequent input prompt to the LLM. NL based output system 120 can cause the LLM engine 141 to process, using an LLM stored in the LLM(s) database

141A, the subsequent input prompt based at least in part on user engagement events and/or additional information retrieved in response to user engagement events to generate a stream of subsequent LLM output that may be provided by NL based output engine 150 for rendition by rendering engine 112 of client device 110. In some implementations, the subsequent LLM output is in the same dialog as the first; in other implementations, the subsequent LLM output is in a separate dialog. Additionally, the examples described herein is not meant to be limiting to text based LLMs, multi-modal LLMs can also be used.

Figure 2:
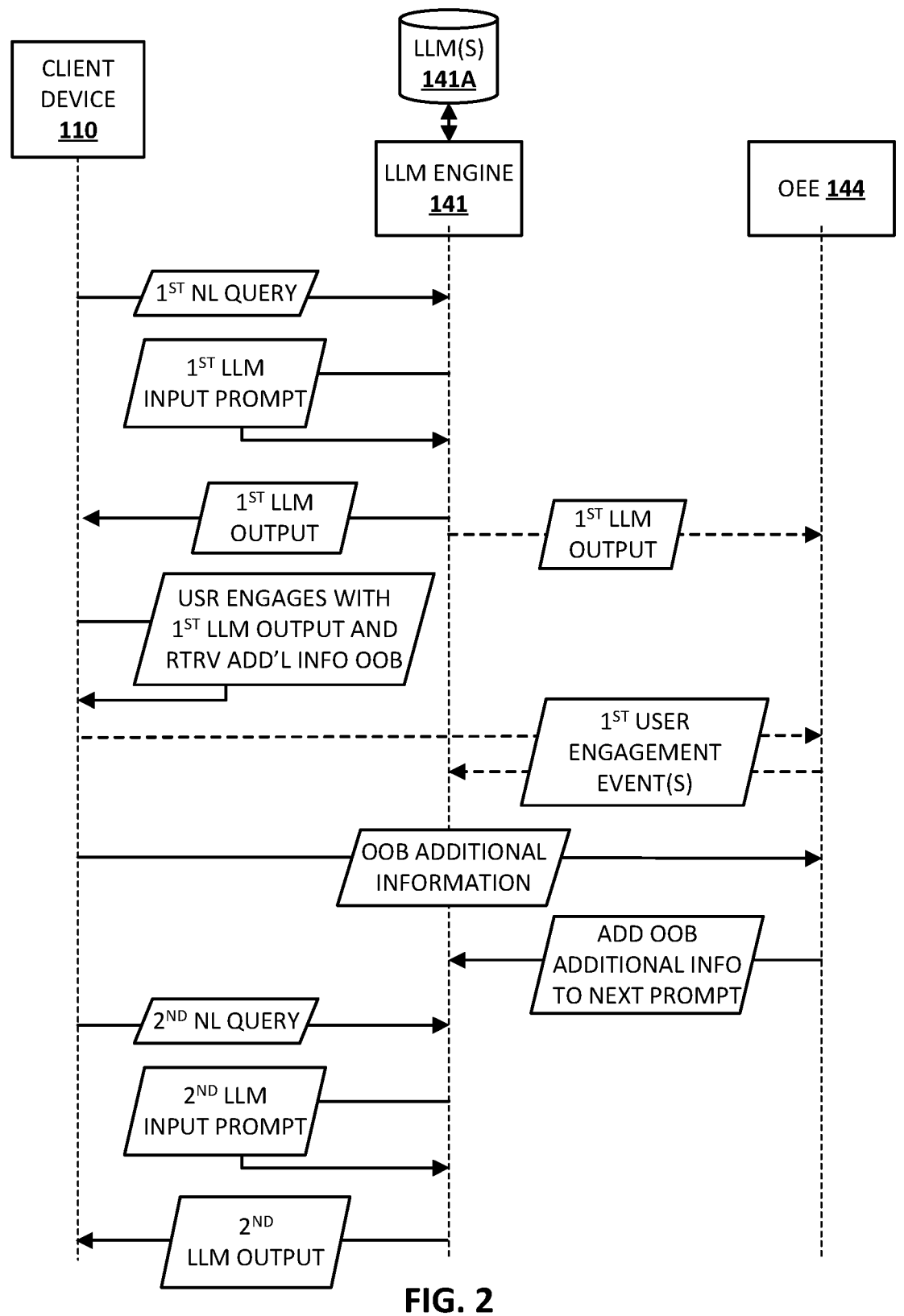
FIG. 2 schematically depicts an example of how various components may exchange data to facilitate user awareness or engagement in a large language model, in accordance with various implementations.

FIG. 2 schematically depicts an example of how client device 110, LLM engine 141, and output engagement engine 144 may exchange data regarding user engagement, in accordance with various implementations. Starting at top left, data indicative of a first NL query (explicitly received or implied) may be provided by client device 110 to LLM engine 141. LLM engine 141 may process the data indicative of the NL query to form a first LLM input prompt. Using an LLM from database 141A, a first LLM output is generated based on processing the newly formed input prompt.

The first LLM output may, in some implementations, be provided to the output engagement engine (OEE) 144. As illustrated in FIG. 2, the user engages with the first LLM output and retrieves additional information out of band (OOB). For example, the user may look up a definition of the word "fiduciary" online (e.g., in a separate tab on an internet browser). As indicated by the dashed arrows, the user engagement event (e.g., the selection and looking up of the word "fiduciary") may, optionally, be provided to the OEE 144, which may also, in some implementations, feed this information back to the LLM engine 141. Regardless, the OOB additional information is provided to the OEE 144, and the OEE 144, in response to receiving this additional OOB information, instructs the LLM engine 141 to add the additional OOB information to a subsequent LLM input prompt.

As the user asks another question, the data indicative of this second NL query (explicitly received or implied) can be provided by client device 110 to LLM engine 141. LLM engine 141 may process the data indicative of the second NL query using the additional OOB information as part of the input to form a second LLM input prompt. Using an LLM from database 141A, a second LLM output is generated by LLM engine 141 and provided to client device 110.

Figure 3:
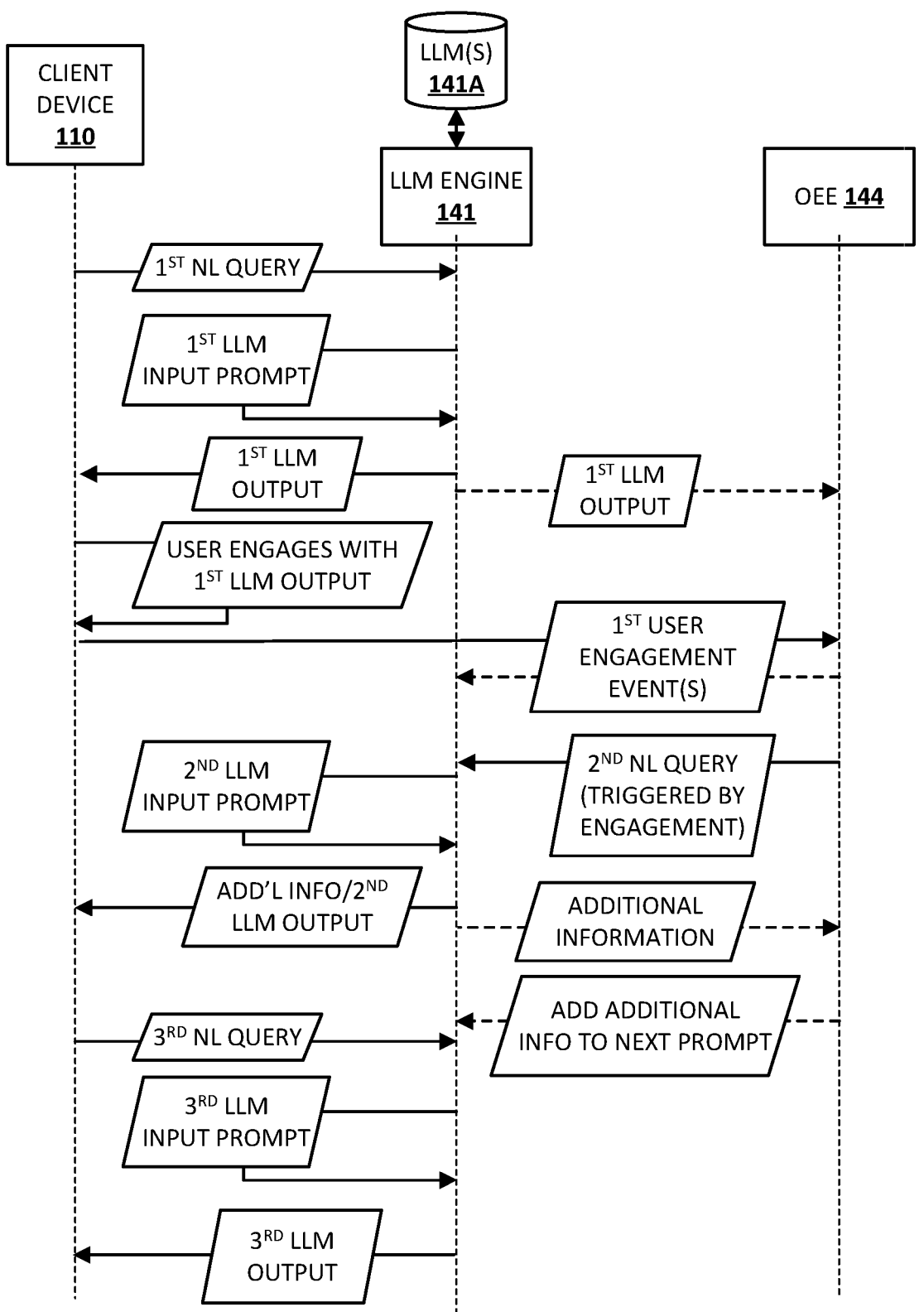
FIG. 3 schematically depicts another example of how various components may exchange data to facilitate user awareness or engagement in a large language model, in accordance with various implementations.

FIG. 3 schematically depicts another example of how client device 110, LLM engine 141, and OEE 144 may exchange data regarding user engagement, in accordance with various implementations. Starting at top left, data indicative of a first NL query (explicitly received or implied) may be provided by client device 110 to LLM engine 141. LLM engine 141 may process the data indicative of the NL query to form a first LLM input prompt. Using an LLM from database 141A, a first LLM output is generated. The first LLM output may, in some implementations, be provided to the OEE 144, which may provide the output to client device 110.

The user engages with the first LLM output, and this first user engagement event is captured by the OEE 144. The OEE 144 may, in some implementations, pass the information about the user engagement event to the LLM engine 141. Otherwise, the OEE 144 generates and provides a second NL query to the LLM engine 141 triggered by the user engagement. For example, if a user hovers over a word for a predetermined length of time (e.g., 3 seconds), this may trigger the OEE 144 to assemble and send a second NL query for LLM engine 141. This results in the LLM engine 141 assembling a second LLM input prompt, processing the second LLM input prompt using an LLM, and providing the additional information in a second LLM output to a user. This additional information may also be provided to the OEE 144 in some cases. Later, when a third NL query (explicitly received or implied) is provided by client device 110 to LLM engine 141, LLM engine 141 may process the data indicative of the NL query to form a third LLM input prompt, along with the additional data that was included in the second LLM output. Using an LLM from database 141A, a third LLM output is generated by LLM engine 141.

In one example, a mouse over event can form part of the conversational context, e.g., to influence future LLM responses in same dialog or future dialogs. For example, if user moused over the term "fiduciary" in LLM output, a subsequent LLM output may be a definition of the term "fiduciary". However, this can also be reflected in the next prompt processed using the LLM. In the above example, the subsequent input may be that the user needed a definition for the term fiduciary, which is used when the user asks a subsequent question—the LLM prompt can be "Respond to Question 2 in view of [Conversation History, including "user needed a definition of 'fiduciary' in last response]".

In another example, the subsequent LLM output may be a modified version of the first LLM output based on the user engagement and/or additional information received based on the user engagement event(s). For example, if the number of mouse over events is over a predetermined number and/or if the duration of the mouse over events is longer than a predetermined length on a particular segment of text the user may be prompted "would you like a simplified version of this". If affirmative user input is received, the subsequent LLM input prompt can be "make the following easier to understand [segment of text]". This "segment of text" can be some or all of the first LLM output or, alternatively, can be non-LLM output (e.g., paragraph(s) from a webpage).

In yet another example, the subsequent LLM input prompt can focus on the speed (e.g., fast vs. slow) and/or extent (e.g., single movement vs. multiple movements; single word vs. multiple words) of mouse over event directed to a portion of the text of the first LLM output. In this example, a "slow" and/or "single" mouse over event directed to word(s) of the first LLM output can be used as at least a portion of a subsequent LLM input prompt resulting in a popup window with a definition of the word(s) and/or additional context for the word(s) as the subsequent LLM output. In contrast, where "fast" and/or "multiple" mouse over events directed to word(s) and/or paragraph(s) of the first LLM output are detected, this can be used as at least a portion of the subsequent LLM input prompt and can result in the paragraph or portion of the text being completely replaced as the subsequent LLM output.

In still yet another example, the user engagement information can be used to provide additional context at a later time and/or through another device. For example, context and/or definitions for word(s) or portions of the first LLM output that the user engaged with can be summarized as a subsequent output at the conclusion of a dialog (e.g., subsequent LLM input prompt of "provide more detail on the following terms that a user had trouble understanding [list of terms]".

FIG. 4 schematically depicts an example scenario in which an LLM is used. In FIG. 4, a user 400 asks client device 110 an inquiry. As an example, the user's inquiry in FIG. 4 is "tell be about merge sort." As described above, an LLM processes the user's query and provides an output. In the example of FIG. 4, the output from the LLM rendered to the user is "merge sort is a sorting algorithm that is based on the divide and conquer strategy. It is one of the most efficient sorting algorithms, with both best- and worst-case complexities being O(N log N)." Also as described above, a user can have a follow up or subsequent inquiry. In the example of FIG. 4, the user asked the subsequent question "is it faster than bubble sort?" The LLM processes the subsequent query and provides an additional response to be rendered on the client device 110 to the user 400. In the example of FIG. 4, the additional response is "yes, merge sort is generally faster than bubble sort. Bubble sort has a worst-case time complexity of O(N^2). This means that merge sort will take at most N Log N comparisons to sort a list of N elements, while bubble sort will take at most N^2 comparisons."

FIG. 5 schematically depicts an example scenario in which selected aspects of the present disclosure may be implemented. Like in the example of FIG. 4, in FIG. 5 a user 500 asks client device 110 an inquiry, "tell be about merge sort." As described above, an LLM processes the user's query and provides an output. In the example of FIG. 5, the output from the LLM rendered to the user is the same as it was in FIG. 4. However, unlike in FIG. 4, in the example of FIG. 5, the user 500 engages with the output of the LLM by looking up an explanation of "O(N log N) complexity" out of band (OOB); for example, by reading about O(N log N) complexity online (e.g., in a separate tab on an internet browser). This would be an example of additional information retrieved based on a user engagement event discussed herein, that could be provided to OEE 144.

In the example of FIG. 5, the user 500 can ask the same follow up question asked in the example of FIG. 4, "is it faster than bubble sort?" LLM engine 141 assembles a subsequent input prompt that includes both the additional information about "O(N log N) complexity" and the follow-up question, and processes the subsequent input prompt using an LLM. Consequently, the additional response from the LLM is "yes, merge sort is generally faster than bubble sort. Bubble sort has a worst-case time complexity of O(N^2)." By way of comparison, the subsequent or additional response from the LLM is shorter in the example of FIG. 5 than it is in the example of FIG. 4 (e.g., the bold portions of FIG. 4 are omitted in FIG. 5). This is because in the example of FIG. 5, the LLM utilized additional information retrieved based on user engagement (e.g., the user looking up information OOB) to inform the subsequent or additional LLM output. In the example of FIG. 5, the user had already looked up information regarding O(N log N) complexity OOB, so the LLM considered user engagement with its previous output and did not present this information in the subsequent output.

FIG. 6 depicts a flowchart illustrating an example method of practicing selected aspects of the present disclosure, in accordance with various implementations. For convenience, the operations of method 600 are described with reference to a system that performs the operations. This system may include one or more processors, memory, and/or other component(s) of computing device(s). Moreover, while operations of the method 600 are shown in a particular order, this is not meant to be limiting. One or more operations may be reordered, omitted, and/or added.

At block 602, the system detects, based on input device signals, one or more user engagement events with an element of a first LLM output generated by an LLM and rendered using one or more output devices. At block 604, the system, e.g., by way of OEE 144, processes the user engagement event(s) in order to retrieve additional information about an element(s) of the first LLM output. As described in detail above, the user engagement event can be, for example, a mouse over event or a user's glance, and the additional information can include information retrieved by a user.

At block 606, the system, by way of the OEE 144, utilizes the additional information retrieved based on the user engagement event to generate or assemble at least a part of a subsequent input prompt for the LLM. This prompt can include, for example, "define [TERM 1]" or "rewrite [PARAGRAPH 2]" or "save summary of user engagement". At block 608, the system, e.g., by way of LLM engine 141, may process the subsequent input prompt based on the user engagement is processed using the LLM. Also at block 508, the system, e.g., by way of NL based output engine 150 and/or rendering engine 112, may cause the content generated in response to the subsequent LLM input prompt to be rendered at one or more output devices, such as a display and/or speaker of client device 110. In some implementations, the subsequent output can be a part of the same dialog as the first LLM output; while in other implementations, the other implementations, the subsequent LLM output can be in a different dialog from the first LLM output. In some implementations, the system may additionally or alternatively provide other types of output or downstream processing. The subsequent LLM output can take a variety of forms. In some implementations, the subsequent LLM output can be a definition of a word or phases. In additional or alternative implementations, the subsequent LLM output can be one or more paragraphs of the first LLM output rewritten. In some other additional or alternative implementations, the subsequent LLM output can be a prompt for a user to answer.

FIG. 7 depicts a flowchart illustrating another example method of practicing selected aspects of the present disclosure, in accordance with various implementations. For convenience, the operations of the method 700 are described with reference to a system that performs the operations. This system may include one or more processors, memory, and/or other component(s) of computing device(s). Moreover, while operations of the method 700 are shown in a particular order, this is not meant to be limiting. One or more operations may be reordered, omitted, and/or added.

Similar to the method described with reference to FIG. 6, at block 702 of FIG. 7, the system detects, based on input device signals, one or more user engagement events with an element of a first LLM output generated by an LLM and rendered using one or more output devices. Unlike the method described with reference to FIG. 6, block 702 includes that the first LLM output is provided during a first dialog session. At block 704, the system, e.g., by way of OEE 144, processes the user engagement event(s) in order to retrieve additional information based on an element(s) of the first LLM output.

At block 406, the system, e.g., by way of LLM engine 141 and/or OEE 144, utilizes the additional information retrieved based on the user engagement event to generate or assemble at least a part of a subsequent input prompt for the LLM. This prompt can include, for example, "define [TERM 1]" or "rewrite [PARAGRAPH 2]" or "save summary of user engagement". The system, e.g., by way of LLM engine 141, may process the subsequent input prompt based on the user engagement is processed using the LLM. At block 708, the system, e.g., by way of LLM engine 141, may cause a subsequent LLM output within the first dialog to be generated for rendition, in response to the subsequent LLM input prompt, to be rendered at one or more output devices. The output device(s) can include, but are not limited to, a display and/or speaker of client device 110. In some implementations, the system may additionally or alternatively provide other types of output or downstream processing. The subsequent LLM output can take a variety of forms. In some implementations, the subsequent LLM output can be a definition of a word or phases. In additional or alternative implementations, the subsequent LLM output can be one or more paragraphs of the first LLM output rewritten. In some other additional or alternative implementations, the subsequent LLM output can be a prompt or a user to answer.

Figure 8:
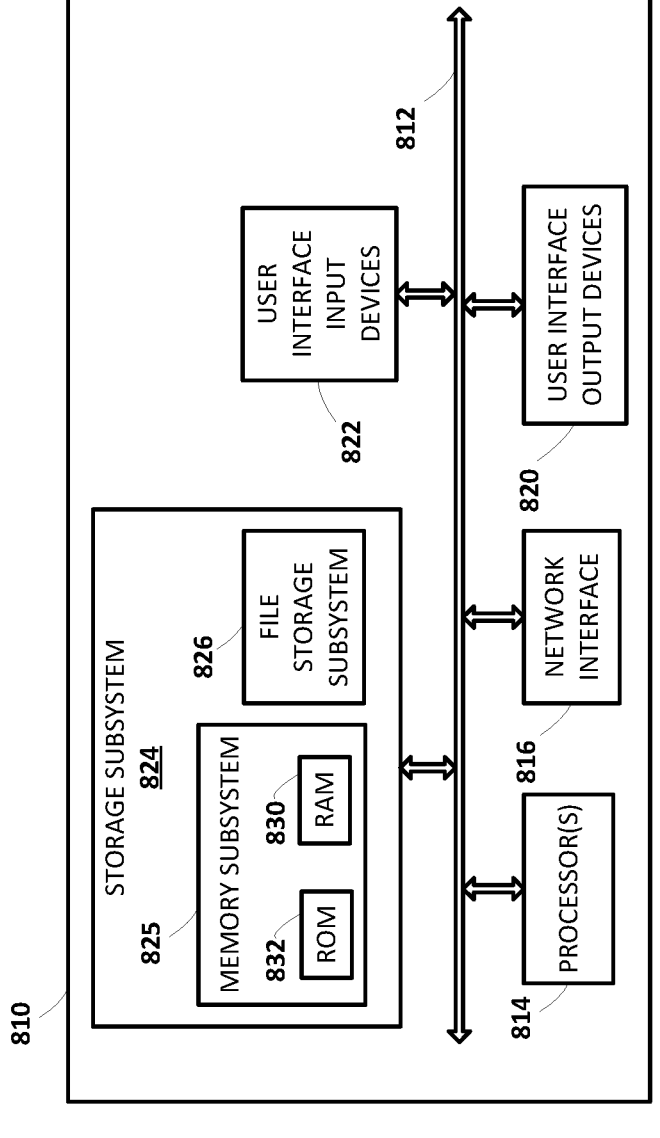
FIG. 8 depicts an example architecture of a computing device, in accordance with various implementations.

Turning now to FIG. 8, a block diagram of an example computing device 860 that may optionally be utilized to perform one or more aspects of techniques described herein is depicted. In some implementations, one or more of a client device, cloud-based automated assistant component(s) or other cloud-based software application component(s), and/or or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIGS. 1-3.

These software modules are generally executed by processor 814 alone or in combination with other processors. Memory 825 used in the storage subsystem 824 can include a number of memories including a main random-access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple buses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
   detecting, based on one or more input device signals, a user engagement event with an element of a first large language model (LLM) output generated using a LLM and rendered using one or more output devices;
   detecting an extent of the user engagement event with the element of the first LLM output generated using the LLM and rendered using the one or more output devices;
   capturing additional information about the element of the first LLM output;
   utilizing the additional information and the extent of the user engagement event with the element to generate at least part of a subsequent input prompt for the LLM; and
   causing the subsequent input prompt to be processed using the LLM to generate a subsequent LLM output for rendition on one or more of the output devices.

2. The method of claim 1, wherein the first LLM output is textual and the user engagement event is a user mouse movement proximate one or more words of the textual output of the LLM.

3. The method of claim 2, wherein the user engagement event further includes a speed of a user mouse movement.

4. The method of claim 2, wherein the extent of the user mouse movement includes a count of the number of mouse movements.

5. The method of claim 1, wherein the first LLM output is textual and the user engagement event is a user glance proximate one or more words of the textual output of the LLM.

6. The method of claim 1, wherein the additional information is rendered on one or more of the output devices in response to the detecting.

7. The method of claim 1, wherein the additional information about the element of the first LLM output is a definition of one or more words of the first LLM output.

8. The method of claim 1, wherein the first LLM output is provided during a first dialog session and the subsequent LLM output is provided during a second dialog session.

9. The method of claim 1, wherein the subsequent LLM output is a prompt for a user to answer.

10. The method of claim 1, wherein the additional information is presented at one or more of the output devices in a pop-up window or as additional LLM output.

11. The method of claim 1, wherein the additional information comprises a digital image portraying the element of the first LLM output.

12. A method implemented using one or more processors and comprising:
   detecting, based on one or more input device signals, a user engagement event with a first element of a first large language model (LLM) output generated using an LLM;
      wherein the first LLM output is provided during a first dialog session;
   detecting an extent of the user engagement event with the first element of the first LLM output generated using the LLM;
   capturing additional information about the first element of the first LLM output;
   utilizing the additional information and the extent of the user engagement event with the first element to generate at least part of a subsequent input prompt for the LLM; and
   causing a subsequent LLM output within the first dialog session to be rendered on one or more output devices.

13. The method of claim 12, wherein the first LLM output is textual and the user engagement event is user mouse movement proximate one or more words of the textual output.

14. The method of claim 12, wherein the additional information about the first element of the first LLM output is a definition of a word of the first LLM output.

15. The method of claim 12, wherein the subsequent LLM output is a prompt for a user to answer.

16. The method of claim 15, wherein the additional information is presented at one or more of the output devices in a pop-up window or as additional LLM output.

17. A system comprising one or more processors and memory storing instructions that, in response to execution, cause the one or more processors to:
   detect, based on one or more input device signals, a user engagement event with an element of first large language model (LLM) output generated using a LLM;

detect an extent of the user engagement event with the element of the first LLM output generated using the LLM;

capture additional information about the element of the first LLM output;

utilize the additional information and the extent of the user engagement event with the element to generate at least part of a subsequent input prompt for the LLM; and cause the subsequent input prompt to be processed using the LLM to generate a subsequent LLM output for rendition on one or more output devices.

18. The system of claim 17, wherein the first LLM output is textual and the user engagement event is a user mouse movement proximate one or more words of the textual output of the LLM.

19. The system of claim 17, wherein the additional information is rendered on one or more of the output devices in response to detection of the user engagement event.

20. The system of claim 17, wherein the additional information comprises a digital image portraying the element of the first LLM output.

* * * * *